United States Patent [19]

Leonberger et al.

[11] Patent Number: 5,317,576
[45] Date of Patent: May 31, 1994

[54] CONTINOUSLY TUNABLE SINGLE-MODE RARE-EARTH DOPED PUMPED LASER ARRANGEMENT

[75] Inventors: Frederick Leonberger, Glastonbury; William H. Glenn, Vernon; Gary A. Ball, Newington, all of Conn.

[73] Assignee: United Technologies Corporation, Hartford, Conn.

[21] Appl. No.: 13,117

[22] Filed: Feb. 1, 1993

Related U.S. Application Data

[63] Continuation-in-part of Ser. No. 732,552, Jul. 19, 1991, abandoned, which is a continuation-in-part of Ser. No. 457,118, Dec. 26, 1989, abandoned, and Ser. No. 659,952, Feb. 26, 1991, abandoned.

[51] Int. Cl.$^5$ ............................................. H01S 3/30
[52] U.S. Cl. ..................................... 372/6; 372/102; 372/69; 372/92; 385/37
[58] Field of Search ................ 372/6, 69, 102, 92; 385/37

[56] References Cited

U.S. PATENT DOCUMENTS

| | | | |
|---|---|---|---|
| 4,133,612 | 1/1979 | Redman | 385/37 |
| 4,682,335 | 7/1987 | Hughes | 372/6 |
| 4,725,110 | 2/1988 | Glenn et al. | 385/37 |
| 4,835,778 | 5/1989 | Kafka | 372/6 |
| 4,900,119 | 2/1990 | Hill et al. | 385/37 |

Primary Examiner—Léon Scott, Jr.
Attorney, Agent, or Firm—Gerald L. DePardo

[57] ABSTRACT

A tunable optical waveguide laser arrangement includes a solid optical waveguide capable of guiding light along an axis between axially spaced ends thereof and being at least in part of an excitable material that emits light in response to stimulation by light. Stimulating light is launched into the waveguide for axial propagation therein and attendant emission of light by the excitable material. Two end reflectors are situated in the waveguide, each at one of the axially spaced ends thereof and extending normal to the axis to delimit a laser cavity. Each of the reflectors is constituted by a Bragg grating consisting of a multitude of axially consecutive grating elements constituted by periodic refractive index perturbations with a given periodicity. The length of the cavity, the peak reflectivity of the Bragg gratings and the gain of the excitable material are so coordinated with one another as to enable lasing in only a single longitudinal mode. The length of that portion of the optical waveguide that incorporates the two Bragg gratings and an intervening region of the optical waveguide is uniformly controlledly varied with attendant continuous tuning of the laser output wavelength without longitudinal mode hopping.

3 Claims, 2 Drawing Sheets

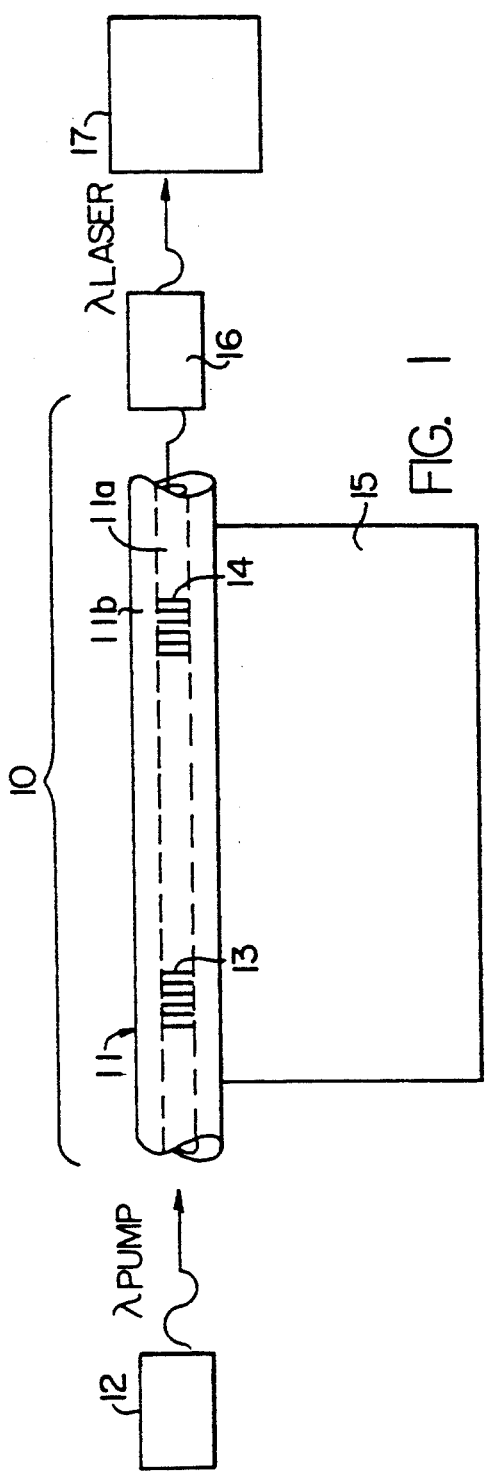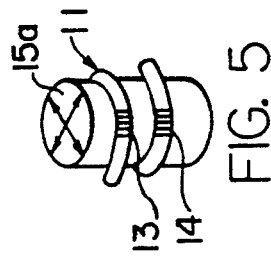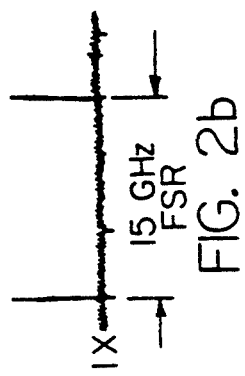

CONTINOUSLY TUNABLE SINGLE-MODE RARE-EARTH DOPED PUMPED LASER ARRANGEMENT

CROSS-REFERENCE TO RELATED APPLICATIONS

The present application is a continuation-in-part of copending U.S. patent application Ser. No. 07/732,552, filed Jul. 19, 1991, now abandoned, which was a continuation-in-part of U.S. applications Ser. No. 07/457,118, filed Dec. 26, 1989, and Ser. No. 07/659,952, filed Feb. 26, 1991, both now abandoned.

TECHNICAL FIELD

The present invention relates to pumped optical fiber lasers in general, and more particularly to lasers of the above type which utilize reflective elements constituted by Bragg gratings.

BACKGROUND ART

There are already known various constructions of pumped optical fiber lasers, among them such utilizing fully or partially reflective coatings on the respective end faces delimiting the laser resonance cavities in the optical fibers, and such using external mirrors to delimit the laser cavities. Even though these solutions have achieved quite a degree of success and/or acceptance in the laser manufacturing and utilization fields, they still suffer of certain drawbacks that make them hardly suitable or totally unsuitable for certain uses, particularly those where operation in only a single longitudinal mode is desired or mandatory.

With increased use of lasers in communication and sensor applications, there is a pronounced need for laser sources that can be continuously tuned and/or chirped. To achieve this, it was proposed to use intracore Bragg gratings as end reflectors delimiting the laser cavity in the optical waveguide, and to apply strains or temperature variations to such gratings alone, thereby changing their peak reflectivity wavelength. Experience has shown, however, that this results in a situation where the tuning is discontinuous in that the fiber laser, while tuning linearly, will also mode hop between adjacent longitudinal modes, that is, not tune smoothly between such modes. This may be of a particular disadvantage in optical communication in that the mode hopping may introduce undesirable noise into the signal.

In other types of lasers, smooth continuous tuning has been attained by simultaneously varying a wavelength dependent feedback of the resonator (i.e. refraction grating or etalon) and the optical cavity length. In most types of lasers, however, this is a very difficult proposition and the solution is correspondingly complex and costly, requiring closely toleranced optics mounts and controls.

Accordingly, it is a general object of the present invention to avoid the disadvantages of the prior art.

More particularly, it is an object of the present invention to provide a pumped optical fiber laser arrangement which does not possess the disadvantages of the known arrangements of this kind.

Still another object of the present invention is so to develop the laser arrangement of the type here under consideration as to be able to continuously tune the same while avoiding longitudinal mode hopping.

A concomitant object of the present invention is to design the optical fiber laser arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a tunable optical fiber laser arrangement which includes a solid optical waveguide capable of guiding light along an axis between axially spaced ends thereof and being at least in part of an excitable material that emits light in response to stimulation by light; means for launching stimulating light into the waveguide for axial propagation therein and attendant emission of light by the excitable material; and two end reflectors each situated in the waveguide at one of the axially spaced ends thereof and extending normal to the axis to delimit a laser cavity. Each of the reflectors is constituted by a Bragg grating consisting of a multitude of axially consecutive grating elements constituted by periodic refractive index perturbations with a given periodicity. The length of the laser cavity, the peak reflectivity of the Bragg gratings and the gain of the excitable material are so coordinated with one another as to enable lasing in only a single longitudinal mode. According to the invention, there is further provided means for uniformly controlledly varying the length of that portion of the optical waveguide that incorporates the two Bragg gratings and an intervening region of the optical waveguide with attendant continuous tuning of the laser output wavelength without longitudinal mode hopping.

BRIEF DESCRIPTION OF THE DRAWING

The present invention will be described in more detail below with reference to the accompanying drawing in which:

FIG. 1 is a somewhat simplified side elevational view of an optically pumped optical fiber laser arrangement constructed in accordance with the present invention;

FIGS. 2a and 2b are depictions of oscilloscope traces obtained during testing of the laser arrangement of the present invention on a testbed shown in FIG. 1;

FIG. 5 is a somewhat diagrammatic view of a modified arrangement for tuning an optical fiber laser akin to that of FIG. 1.

BEST MODE FOR CARRYING OUT THE INVENTION

Figure 3:
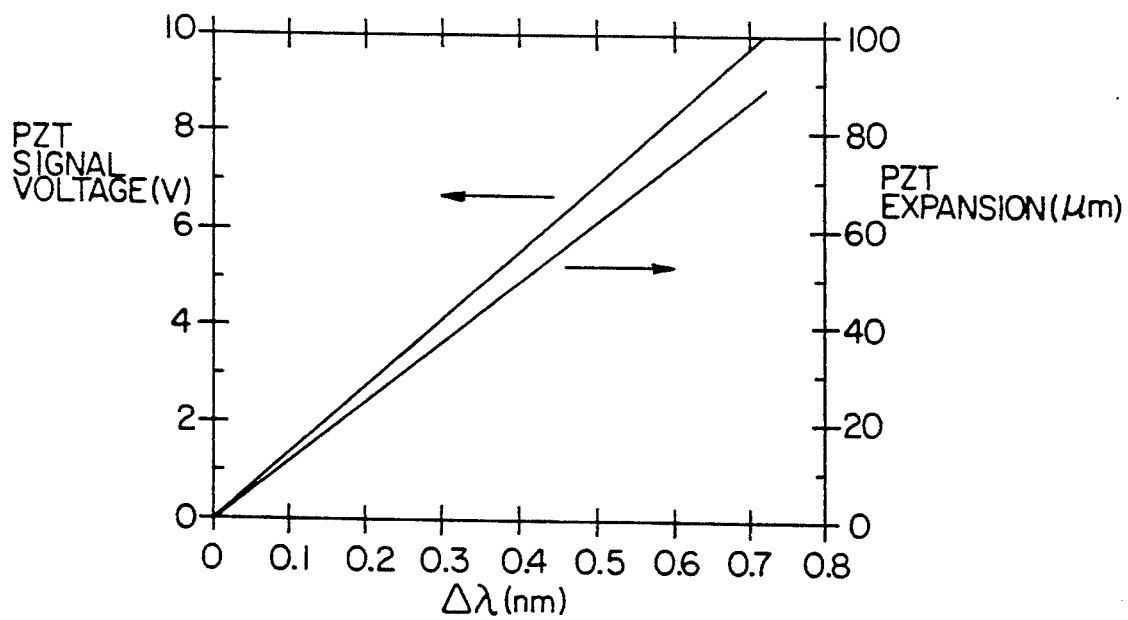
FIG. 3 is a graphic representation of the dependence of the wavelength of the pumped optical fiber laser on the voltage applied to, and on the expansion of, the piezoelectric transducer forming a part of the arrangement of FIG. 1.

Referring now to the drawing in detail, and first to FIG. 1 thereof, it may be seen that the reference numeral 10 has been used therein to identify a pumped optical fiber laser arrangement in its entirety. The arrangement 10 includes, as its main components, an optical fiber section 11 and a laser pump 12 which is of any known construction and advantageously is constituted by or includes a diode laser. The laser pump 12 issues light of a wavelength $\lambda_{laser}$, and this light is launched, in any well known manner, into the optical fiber section 11 for propagation longitudinally thereof. As is well known to those practicing in this field, the optical fiber section 11 includes a fiber core 11a and a cladding 11b surrounding the core 11a, which together form an optical waveguide, with the stimulating light from the laser pump 12 being launched into and guided in this waveguide.

The optical fiber section 11 is shown to be provided, in the core thereof, with two gratings 13 and 14 which are spaced from one another in the longitudinal direction of the section 11 and are shown to be situated at respective ends of the section 11. The gratings 13 and 14 are reflective, to a greater or lesser degree, but only to light within a very narrow band around a central wavelength $\lambda_{laser}$, being substantially transparent to light at all other wavelengths, including, at least as far as the grating 13 is concerned, the pumping wavelength $\lambda_{pump}$. Thus, the gratings 13 and 14 act as reflectors and thus longitudinally delimit the laser cavity in which the lasing takes place.

The optical fiber section 11 is mounted on a piezoelectric transducer (PZT) 15. The transducer 15 is of any well known construction so that it has been illustrated only diagrammatically. As is well known, an actuator 15 of this type changes at least its axial dimension (i.e. that which is parallel to the optical fiber section 11) in response to the application of an electric field thereto. The optical fiber section 11 is secured to the transducer 15 in any well known manner, either over the entire length of at least the pumped laser or, preferably, at axially spaced attachment locations that, in accordance with the present invention, are situated outside the area occupied by the pumped laser, that is, between the respective grating 13 and 14 and the optical fiber section end face that is closer to it. The attachment is such that at least the pumped laser area of the section 11 is taut even when the transducer 15 is not energized. As a result, the dimensional change (axial expansion) of the transducer 15 causes uniform stretching of the entire portion of the optical fiber section 11 that is located between the attachment zones, that is, the portion which includes the gratings 13 and 14 and the optical fiber region situated therebetween. Consequently, as will be discussed in more detail below, the lasing cavity optical path length and the peak reflectivity of the gratings 13 and 14 change proportionately to one another in response to the dimensional changes of the transducer 15, resulting in gradual tuning of the lasing wavelength $\lambda_{laser}$ in dependence on the extent of dimensional change imposed by the transducer 15 on the aforementioned optical fiber portion, without longitudinal mode hopping.

It has been established that continuous tuning of a single mode fiber laser 10 which utilizes intra-core Bragg reflectors 13 and 14 for cavity feedback can be achieved when both the gratings 13 and 14 and the intervening fiber region are stretched and/or heated uniformly. In this case, longitudinal mode hopping is avoided inasmuch as the change in the reflected wavelength from the Bragg reflectors 13 and 14 tracks the change in the cavity resonance wavelength. This wavelength tracking can be analytically described in the following manner.

In general, a fiber laser resonator of a length $L_c$ will lase at wavelengths that satisfy the cavity resonance condition $$\lambda_o = \frac{2}{m} nL_c \tag{1}$$

where $\lambda_o$ is a resonance wavelength, n is the refractive index, and m is a large integer. A change in the optical path length of the fiber due to either heating or stretching the fiber will result in a change in resonance wavelength amounting to $$\frac{\delta\lambda_o}{\lambda_o} = \frac{\delta n}{n} + \frac{\delta L_c}{L_c} = (1 - \rho_e)\epsilon + (\alpha + \zeta)\Delta T \tag{2}$$

where $\alpha$ is the coefficient of linear expansion, $\zeta$ is the thermo-optic coefficient, $\sigma_e$ is the photoelastic constant, and $\epsilon$ is the applied strain.

On the other hand, the effects of strain or thermal variation applied to sinusoidal intra-core Bragg reflector 13 or 14 can be ascertained from the Bragg condition $$\lambda_B = 2n\Lambda, \tag{3}$$

that relates the wavelength $\lambda_B$ of the reflected radiation at line center to the grating period $\Lambda$. Then, the change in the Bragg wavelength as a function of strain or thermal variation applied to the fiber region containing the grating 13 or 14 is given by:

$$\frac{\delta\lambda_B}{\lambda_B} = \frac{\delta n}{n} + \frac{\delta \Lambda}{\Lambda} = (1 - \rho_e)\epsilon + (\alpha + \zeta)\Delta T. \tag{4}$$

It may be seen from a comparison of the above equations (2) and (4) that, when equal strain and/or thermal variation is applied to both the Bragg reflectors 13 and 14 and the intervening region of the fiber, the change in the Bragg wavelength matches the change in the cavity resonance wavelength. Since the single longitudinal mode optical fiber laser lases only in the lowest loss mode, the wavelength of such a lowest loss mode will track the change in the cavity resonance and the laser will tune smoothly without mode hopping. This assumes that the gain is relatively flat over he bandwidth of the grating, typically $\leq 0.1$ nm. However, this is usually the case in rare earth doped fiber lasers.

A continuously tuned fiber laser was demonstrated using the testbed illustrated in FIG. 1 of the drawing. In addition to the laser arrangement 10 that includes the optical fiber section 11, the pumping laser 12 and the transducer 15, the testbed included an optical isolator 16 and a scanning Fabry-Perot resonator 17. The 1.53 $\mu$m fiber laser was fabricated in erbium doped germanosilicate fiber. The fiber was doped at approximately 550 ppm, had a 1.02 $\mu$m cutoff wavelength, and a numerical aperture (NA) of 0.24. The laser cavity was formed in the fiber core 11a by writing the two Bragg reflectors 13 and 14 therein noninvasively though the cladding 11b, using the two-beam interference technique disclosed in the commonly owned U.S. Pat. No. 4,807,805, the disclosure of which is incorporated herein by reference to the extent necessary to provide additional explanation of the type of the Bragg gratings that is particularly suited for use in the optical fiber laser arrangement 10.

As more fully explained in the above patent, gratings 13 and 14 of this type act as wavelength selective reflectors. An embedded grating of specified periodicity will partially or fully reflect a specific wavelength of an optical signal carried by the fiber section 11. This type of grating is incorporated or embedded in the core of an optical fiber by a method disclosed in the above patent. As discussed there, permanent periodic gratings of this kind can be provided or impressed in the core of an optical fiber by exposing the core through the cladding to the interference pattern of two compatible ultraviolet light beams that are directed against the optical fiber at two angles relative to the fiber axis that supplement each other to 180°. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute a Bragg grating. The embedded Bragg grating of this kind reflects, of the light launched into or otherwise guidedly propagating in the fiber core in a propagation direction that brings it to the respective grating 13 or 14, only that having a wavelength within a very narrow range around a central wavelength $\lambda_{laser}$ that is dependent on the grating element periodicity, back along the fiber axis opposite to the original propagation direction while being substantially transparent to light at wavelengths outside the aforementioned narrow band so that it does not adversely affect the passage of such other light therethrough. In effect, this type of grating creates a narrow notch in the transmission spectrum and, by the same token, a similarly narrow peak in the reflection spectrum. This reflection spectrum peak is being utilized in accordance with the present invention to determine the lasing wavelength $\lambda_{laser}$, and the axial length of each of the gratings 13 and 14 is selected in such a manner as to obtain the desired reflectivities at the gratings 13 and 14, respectively.

For the optical fiber section 11 to operate as an optically pumped laser, the material of at least the core thereof is to contain at least one dopant that will show gain when pumped, for instance, a rare-earth element, such as neodymium or erbium. On the other hand, the above patent teaches the making of the gratings of the type here under consideration in germanium doped optical fiber cores. To obtain an optically pumped laser in accordance with the present invention, it is currently preferred to impress the gratings 13 and 14 directly into the (rare-earth doped) active material of the optical fiber section 11 (or its core), in which case at least the regions of the active material that are to be provided with the gratings 13 and 14 are doped with germanium as well. However, it would also be possible to form such gratings 13 and 14 in optical fiber pieces (or cores thereof) of a germanium-doped passive material, and to splice the same with an optical fiber piece made of, or having a core of, the rare-earth doped active material, to thus obtain the optical fiber section 11. In either event, it is important to assure that the optical fiber section 11 be at least optically unitary or integral, in that the materials employed in different regions thereof exhibit similar responses to strains and temperature variations, thus avoiding problems that could arise from the presence of optical discrepencies between such regions. The pumped laser is preferably optically isolated from optical feedback at both ends. To this end, the optical fiber section 11 may be delimited, at respective ends thereof, by respective end faces that are inclined at the Bragg angle with respect to the axis of the section 11 to minimize or eliminate undesired reflections therefrom. As a matter of fact, the fiber end faces were advantageously polished to angles of 10° to ensure that reflections from the fiber end faces do not interfere with the single mode operation of the fiber laser 10. This, however, is not shown because other known ways of optical feedback isolation could be used instead or in addition.

The gratings 13 and 14 were written, approximately 10 cm apart, with an excimer-pumped dye laser operating at the wavelength of 240 nm. The desired 95% Bragg reflectivity was achieved by using an exposure time of 35 seconds, with the writing laser operating at an average power of 15 mW and with a pulse repetition rate of 25 Hz. Equal reflectivity was chosen for both of the Bragg gratings 13 and 14 to ensure optimum grating overlap. In addition, great care was taken to ensure that no external cavities existed in this experimental configuration.

The fiber laser included in the optical fiber section 11 was pumped with the pump laser 12, which was constituted by a Ti-Sapphire laser, to give an output power of 100 $\mu$W. The fiber laser threshold was very low since it takes little pump power to achieve near complete inversion of the erbium population in the short length of the low doped fiber. The slope efficiency of the fiber laser, which is defined as the slope of the laser output power as a function of the coupled pump power, was determined to be approximately 0.1%. This relatively low slope efficiency is attributable to the fact that most of the pump power is not absorbed in the fiber but rather passes therethrough beyond the pumped laser.

The desired single mode operation with a linewidth of less than or equal to 15 MHz was confirmed with the scanning Fabry-Perot interferometer 17 that had a free spectral range of 15 GHz and a finesse of 1000. The results of these measurements are depicted in FIGS. 2a and 2b. The actual laser linewidth was probably much less than what is shown there. The laser operated in a single longitudinal mode for all applied pump powers (up to several hundred mW).

As alluded to before, the optical fiber section 11 incorporating the laser was mounted, at its two ends, on the piezoelectric transducer 15 that exhibited a 90 $\mu$m maximum range of travel (i.e. axial expansion). The PZT 15 was equipped with a position sensor an an expansion control circuit of a known construction to eliminate the affects of hysteresis. When the laser was stretched to the full 90 $\mu$m extent, a maximum wavelength tuning of $\Delta\lambda=0.72$ nm, or $\Delta\nu=92.3$ GHz, was realized. Thus is consistent with the fact that the spacing between the mounting points or zones was approximately 15.3 cm. This leads to $\delta\lambda/\lambda\approx0.81\epsilon$, as indicated in FIG. 3 of the drawing. For silica, the effective photoelastic constant is 0.22, which would translate into $\delta\lambda/\lambda$ amounting to 0.78$\epsilon$. However, core doping can change the photoelastic constant.

Figure 4:
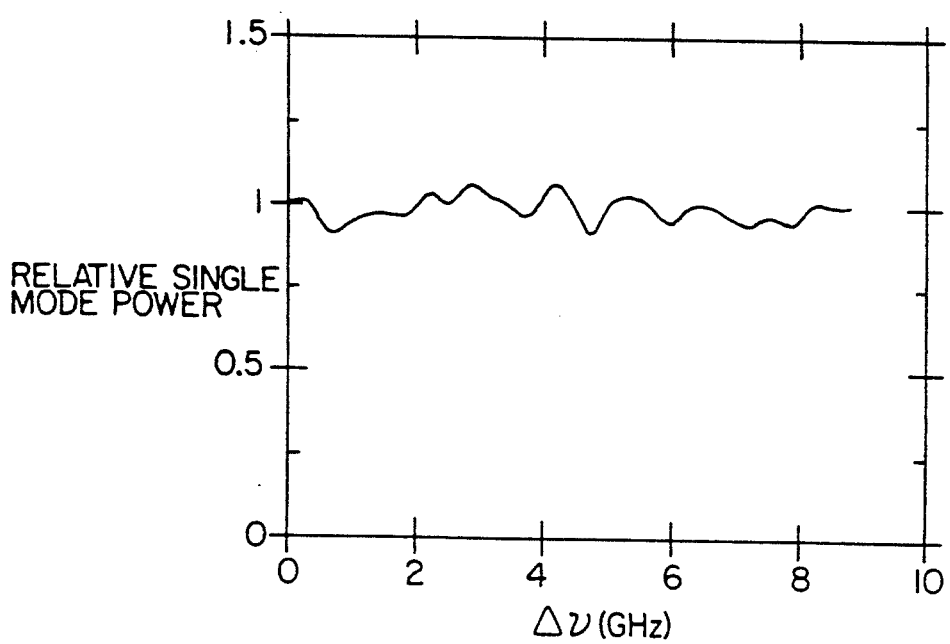
FIG. 4 is a graphic representation of the amplitude of the pumped laser output beam of the arrangement of FIG. 1 as a function of tuned frequency within a test window.

Because of equipment constraints, the tuning over that entire 92 GHz tuning range had to be conducted in respective 9 GHz windows. The amplitude of the single lasing mode is plotted as a function of frequency within one of such windows in FIG. 4 of the drawing. In this context, it is to be mentioned that the amplitude variation that can be observed in FIG. 1 can be attributed mainly if not exclusively to the 10% pump laser jitter, rather than to the tuning process. No longitudinal mode hopping was observed while tuning in either one of the 9 GHz windows, so that the tuning has been determined to occur without longitudinal mode hopping throughout the tuning range.

In the alternative, the reflection wavelength of the gratings 13 and 14 and the resonator cavity length can be concurrently and uniformly tuned in the manner illustrated in FIG. 5 of the drawing. In this case, the portion of the optical fiber section 11 that includes the variable gratings 13 and 14 is wrapped around a mandrel 15a that again may be of piezoelectric material and is then radially expanded, as indicated by arrows, by applying electrical potential differences thereto, so as to change the circumference thereof and thus ultimately the spacings between the respective grating elements with attendant shifts in the central wavelength $\lambda_{laser}$. The high longitudinal mode selectivity of such gratings is beneficial in this instance as well.

While the present invention has been illustrated and described as embodied in a particular construction of an embedded grating laser arrangement, it will be appreciated that such invention is not limited to this particular example; rather, the scope of protection thereof is to be determined solely from the attached claims.

We claim:

1. A tunable optical waveguide laser arrangement comprising:

a solid optical waveguide guiding light along an axis between axially spaced ends thereof and being located within a portion of an excitable material that emits coherent light in response to stimulation by pump light;

means for launching said pump light into the waveguide for axial propagation therein and attendant emission of coherent light by the excitable material;

two end reflectors each situated in the waveguide at one of the axially spaced ends thereof and extending normal to the axis to delimit a laser cavity, each of said reflectors being constituted by a Bragg grating consisting of a plurality of axially consecutive grating elements constituted by periodic refractive index perturbations with a given periodicity, the length of said cavity, the narrow peak reflectivity of said Bragg gratings and the frequency response of the gain of the excitable material being coordinated with one another such that lasing occurs only at a single longitudinal mode; and means for uniformly controlledly varying the length of that portion of said optical waveguide that incorporates the two Bragg gratings and an intervening region of said optical waveguide such that attendant continuous tuning of the laser output wavelength occurs without longitudinal mode hopping.

2. The arrangement as defined in claim 1, wherein said material exhibits a gain that exceeds a lasing threshold only by an amount small enough for the product of gain and grating reflectivity to rise to a level at which lasing takes place only for said at most few longitudinal modes.

3. The arrangement as defined in claim 1, wherein the other of said reflectors is constituted by another grating substantially identical to said one Bragg grating and axially delimiting said laser cavity at said other end.

* * * * *

UNITED STATES PATENT AND TRADEMARK OFFICE
CERTIFICATE OF CORRECTION

PATENT NO. : 5,317,576
DATED : May 31, 1994
INVENTOR(S) : Gary A. Ball, James P. Waters, William H. Glenn It is certified that error appears in the above-indentified patent and that said Letters Patent is hereby corrected as shown below:

Title page: (75) Inventors:
   Replace "Frederick Leonberger, Glastonbury; William H. Glenn, Vernon; Gary A. Ball, Simsburg, all of Conn." with --Gary A. Ball, Newington; James P. Waters, Ellington; William H. Glenn, Vernon; all of Conn.--

Title page: Code (54)
   Replace "Continously" with --Continuously--

Signed and Sealed this

Twenty-fifth Day of July, 1995

Attest:

BRUCE LEHMAN

Attesting Officer

Commissioner of Patents and Trademarks

Disclaimer 5,317,576 —Frederick Leonberger, Glastonbury; William H. Glenn, Vernon; Gary A. Ball, Newington, all of Conn. CONTINOUSLY TUNABLE SINGLE-MODE RARE-EARTH DOPED PUMPED LASER ARRANGEMENT. Patent dated May 31, 1994. Disclaimer filed January 23, 1995, by the assignee, United Technologies Corporation.

Hereby enters this disclaimer to claims 2 and 3 of said patent.

*(Official Gazette* September 5, 1995.)